(12) United States Patent
Kull et al.

(10) Patent No.: US 9,888,729 B2
(45) Date of Patent: Feb. 13, 2018

(54) LIGHT-EMITTING TEXTILE ELEMENT WITH A FREE CONNECTION SYSTEM

(71) Applicant: LIGHT FLEX TECHNOLOGY, S.L., Barcelona (ES)

(72) Inventors: Marten Kull, Barcelona (ES); Victoria Backsin, Barcelona (ES); Cristina Casellas Coll, Mataro Barcelona (ES); Santiago Perez De La Hoz, Mataro Barcelona (ES)

(73) Assignee: LIGHT FLEX TECHNOLOGY, S.L., Barcelona (ES)

( * ) Notice: Subject to any disclaimer, the term of this patent is extended or adjusted under 35 U.S.C. 154(b) by 0 days.

(21) Appl. No.: 15/305,847

(22) PCT Filed: Apr. 23, 2014

(86) PCT No.: PCT/ES2014/070349
§ 371 (c)(1),
(2) Date: Oct. 21, 2016

(87) PCT Pub. No.: WO2015/162308
PCT Pub. Date: Oct. 29, 2015

(65) Prior Publication Data
US 2017/0042261 A1 Feb. 16, 2017

(51) Int. Cl.
*F21V 23/02* (2006.01)
*A41D 13/01* (2006.01)
(Continued)

(52) U.S. Cl.
CPC ............ *A41D 13/01* (2013.01); *F21V 21/088* (2013.01); *F21V 23/02* (2013.01); *F21V 23/06* (2013.01);
(Continued)

(58) Field of Classification Search
CPC ... A41D 13/01; F21V 21/088; F21V 21/0885; F21V 21/08; F21V 23/02; F21V 23/06;
(Continued)

(56) References Cited

U.S. PATENT DOCUMENTS 5,491,377 A 2/1996 Janusauskas
5,552,679 A 9/1996 Murasko
(Continued)

FOREIGN PATENT DOCUMENTS

EP 2229037 A1 9/2010
WO 9830069 A1 7/1998
(Continued)

OTHER PUBLICATIONS

International Search Report and Written Opinion dated Dec. 16, 2014, from the corresponding PCT/ES2014/070349.
(Continued)

*Primary Examiner* — Anne Hines
(74) *Attorney, Agent, or Firm* — Katten Muchin Rosenman LLP

(57) ABSTRACT

The invention relates to a light-emitting textile element with a free connection system, comprising an electroluminescent lamp comprising a substrate layer (2), a first electrode (3), an active dielectric layer (4), an intermediate electroluminescent layer of zinc sulfide (5), a second electrode (6), a transparent conductive layer (7) and an upper layer (8) which is joined to the substrate layer (2), where the upper layer (8) has holes (9) along the length thereof, designed to receive metal pins (10) of an extractable connecting part (11) which connects to the electronic control system and the power supply. The connecting part (11) is a clip with a system for wirelessly connecting to the electronic control system and the power battery. Preferably, it is a strip which
(Continued)

FIG. 2 is continuously produced with a non-plastic textile substrate layer (2) and a reflective upper layer (8).

9 Claims, 1 Drawing Sheet

(51) Int. Cl.
| | | |
|---|---|---|
| *H01R 12/77* | (2011.01) | |
| *H05B 33/14* | (2006.01) | |
| *F21V 21/088* | (2006.01) | |
| *F21V 23/06* | (2006.01) | |
| *F21V 33/00* | (2006.01) | |
| *H05B 33/22* | (2006.01) | |
| *H02J 17/00* | (2006.01) | |

(52) U.S. Cl.
CPC ......... *F21V 33/0008* (2013.01); *H01R 12/77* (2013.01); *H05B 33/14* (2013.01); *H05B 33/22* (2013.01); *H02J 17/00* (2013.01)

(58) Field of Classification Search
CPC .. F21V 33/0008; F21V 33/0004; F21V 33/00; H01R 12/77; H01R 33/14; H01R 33/22
See application file for complete search history.

(56) References Cited

U.S. PATENT DOCUMENTS

| | | | |
|---|---|---|---|
| 7,248,169 B2 * | 7/2007 | Mimura | G02B 5/045 340/572.7 |
| 9,148,938 B2 * | 9/2015 | Safar | F21V 23/0435 |
| 2003/0213045 A1 | 11/2003 | Fuentes | |
| 2006/0017059 A1 | 1/2006 | Strip et al. | |
| 2006/0131505 A1 | 6/2006 | Kerr et al. | |
| 2007/0161314 A1 | 7/2007 | Pendlebury et al. | |
| 2010/0231113 A1 | 9/2010 | Hehenberger | |
| 2010/0270924 A1 | 10/2010 | Kaminska et al. | |

FOREIGN PATENT DOCUMENTS

| | | |
|---|---|---|
| WO | 2007013001 A2 | 2/2007 |
| WO | 2010022317 A2 | 2/2010 |
| WO | 2012145766 A2 | 10/2012 |
| WO | 2013057683 A2 | 4/2013 |

OTHER PUBLICATIONS

International Preliminary Report on Patentability dated Oct. 25, 2016, from the corresponding PCT/ES2014/070349.
Kaappa et al. "High Frequency Welding: Applications and Opportunities to Integrate Electronics into Textiles"; Smartex Research Journal, vol. 1, No. 1, Mar. 2012; Smartex,Recuperado de Internet http://www.kfs.edu.eg/srj/pdf/9.pdf.

* cited by examiner

LIGHT-EMITTING TEXTILE ELEMENT WITH A FREE CONNECTION SYSTEM

OBJECT OF THE INVENTION

The invention, as stated in the title of the present description, relates to a light-emitting textile element with a free connection system, which provides several advantageous and innovative characteristics inherent to the particular configuration thereof, which is described in detail below and which amount to a noteworthy novelty in the current state of the art.

The object of the present invention is specifically focused on a textile element of the type that is applied to clothing used by emergency services in situations where there is low visibility, which is made up of a series of layers constituting an electroluminescent lamp and which, in turn, is reflective, also having the special feature of being designed with a structure that allows the position of the points of connection to vary without limitations, thereby advantageously allowing manufacturing to be continuous instead of by pieces that limit their dimensions, to be able to be cut to the desired size or shape.

FIELD OF APPLICATION OF THE INVENTION

The field of application of the present invention falls within the industry sector dedicated to manufacturing electroluminescent and reflective fabrics and similar elements.

BACKGROUND OF THE INVENTION

The use of reflective elements on clothing for the safety of those wearing the clothing in order to be seen in situations where there is little visibility is well known. However, these elements have limited efficiency, since they are only visible when light shines upon them.

The existence of electroluminescent lamps, which consist of several layers of sheets that emit their own light when connected to power source, able to be incorporated into clothing designed for protection and safety in situations where there is little visibility, is also well known.

However, these sheets have certain limitations, mainly due to the fact that they have connections at their ends, which necessarily puts limitations to their design, and furthermore, their manufacturing must be done by using pieces of dimensions with a specific maximum longitude, which always leads to disadvantages in tailoring compared to systems of continuous manufacturing.

On the other hand, the substrate on which the mentioned sheets are incorporated is usually made of polycarbonates or polyester and the upper protective layer is usually a sheet of PVC or polycarbonate, which makes it so the sheets have little flexibility and do not sag or have the texture of a non-plastic fabric, such as knitted or crocheted fabric or a printed woven fabric.

It would therefore be desirable to have an improved type of light-emitting element that provided advantages to the previously described limitations of the systems that are currently known, the development of said element being the essential object of the present invention.

As a reference to the current state of the art, it is important to highlight that there are many different documents related to the object of the present invention that are known, among which it is worth mentioning the most relevant ones, such as the following patents:

The patent US2010231113, related to a "Laminate reflective and electroluminescent article" that includes one or more electroluminescent structures, which may in some embodiments be discontinuous from each other, in addition to one or more retroreflective structures and, optionally, a removable carrier film disposed over the electroluminescent structures and the retroreflective structures.

The patent WO2010022317, related to a "Flexible backlit display" that refers to a graphics display assembly configured to display a true color palette in illuminated and non-illuminate states. The graphics display assembly includes a backlit electroluminescent (EL) panel and optical interface layer.

The patent US2007161314, related to a "Method of making an electroluminescent light", comprising a front electrode, a phosphor layer, a dielectric layer and a rear electrode layer. Connecting devices are attached to each split electrode area, which are adapted to be connected to a power source.

The patent U.S. Pat. No. 5,491,377, also related to an "Electroluminescent lamp and method", which also comprises a substrate layer, an intermediate phosphor layer, an active dielectric layer, a second electrode, a conductor and a protective layer or encapsulant, provides in this case a single non-hygroscopic binder that is used for all layers (with the optional exception of the rear or lower electrode) thereby reducing delamination as a result of the changes in temperature and the susceptibility to moisture.

However, none of the previous inventions and patents, either separately or together, describes the present invention as claimed herein.

DESCRIPTION OF THE INVENTION

Thus, the light-emitting textile element with a free connection system that the invention proposes amounts to a noteworthy novelty within its field of application, since by employing it one may satisfactorily reach the aforementioned objectives, the characterizing details that make it possible and set it apart from that which is known, being duly recorded in the claims included at the end of the present specification.

As has been previously mentioned, the textile element which is the object of the invention is designed to be applied to clothing or other textile objects in order to provide protection for the user through the emission of its own light and, at the same time, reflective light in situations where there is low visibility, the clothing used by emergency services being a clear example of said use.

Therefore, the textile element of the invention specifically comprises a series of layers which, having a similar configuration to the electroluminescent sheets already known, consist of a substrate layer, a first electrode, an active dielectric layer, an intermediate layer of an electroluminescent element, for example Zn sulfide, a second electrode, a transparent conductive layer and an upper layer, with a unique feature in that the upper layer, which is the reflective layer, has a continuous series of spaces which are suitable for the insertion of connectors in its central area and on the edges that join the substrate layer, which advantageously provides the possibility to be able to incorporate said connectors at any point along a textile element configured in this way.

This possibility, in turn, makes it possible to be able to produce said textile element as a continuous roll without a limitation to the maximum longitude, and therefore it is not necessary to have connectors at the ends of one piece, with the possibility for the piece to be cut to any measurement or size.

On the other hand, it is well known that for any known electroluminescent article there are three different basic elements that are necessary: the electroluminescent lamp, the electronic control system with batteries for power and the cables or connection between both.

Thus, in the textile element of the invention, the connector is made up of one plastic piece, which is coupled to any point of the textile element by clips, and has two grafted metal pins that maintain the seal of the connection and do not need connectors at their ends. Moreover, this connecting part allows the grafted metal pins to emerge to the exterior surface and to be linked to the electronic control system and the battery without the need to have a physical connection between both elements through cables, contributing an added advantage to the system.

Lastly, it is important to highlight that for the substrate layer, the use of a non-plastic textile material is envisaged, since it provides flexibility and sagging that is very similar to knitted or crocheted fabric or a printed woven fabric, which undergoes a specific treatment process in order to join it to the reflective layer using techniques of high-frequency fusion, making a vacuum so that both layers are perfectly joined.

In doing so, it is possible to produce a textile element that has reflective properties on 100% of its surface and which, in turn, can also emit its own light on 100% of its surface, coinciding with the reflective area, if so desired, when coupling the connector.

The electroluminescent surface can be discontinuous, such as in the typical Battenberg pattern of the police forces, descriptive letters or names, such as "Police", "Fire Dept.", "Automobile Club", a car brand, etc., while at the same time conserving 100% of its reflective capacity.

The described light-emitting textile element with a free connection system therefore consists of an innovative structure with structural and constituent features heretofore unknown for their intended purpose, reasons which, taken together with its usefulness, provide it with sufficient grounds for obtaining the requested exclusivity privilege.

DESCRIPTION OF THE DRAWINGS

To complement the present description, and for the purpose of helping to make the characteristics of the invention more readily understandable, the present specification is accompanied by one drawing, constituting an integral part of the same, which by way of illustration and not limitation represents the following.

PREFERRED EMBODIMENT OF THE INVENTION

Figure 1:
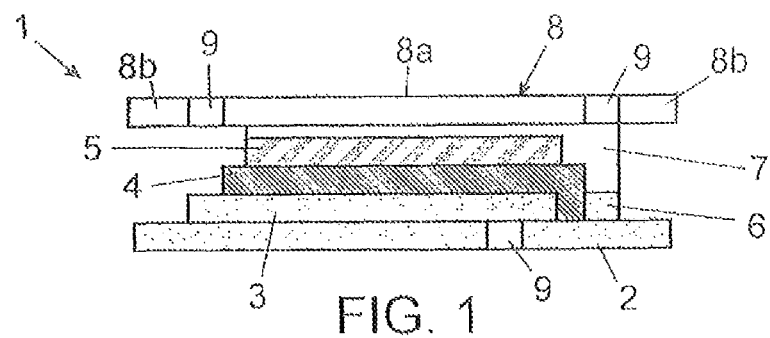
FIG. 1. shows an enlarged cross-sectional schematic view of a light-emitting textile element with a free connection system, which is the object of invention, in which the layers that comprise the structure and arrangement thereof can be seen.

In light of the aforementioned figures and in accordance with the adopted numbering, one may observe therein an example of a preferred, non-limiting embodiment of light emitting textile element with a free connection system of the invention, which comprises the parts and elements that are indicated and described in detail below.

Therefore, as can be observed in said figures, the textile element (1) in question has the form of a continuous band, with a structure that comprises at least one electroluminescent lamp made up of:

a substrate layer (2);
a first electrode (3), preferably made of silver (Ag);
an active dielectric layer (4);
an intermediate electroluminescent layer (5), made up of one element, electroluminescent salt or compound, such as Zinc sulfide (ZnS);
a second electrode (6), preferably made of gold (Ag);
a transparent conductive layer (7) that has electric contact with the second electrode (6) and which covers the intermediate electroluminescent layer (5); and
An upper reflective layer (8) that is joined at its ends to the substrate layer (2), The Zinc sulfide (ZnS) of the intermediate electroluminescent layer (5) can be substituted by another electroluminescent element or compound, such as Zinc sulfide doped with copper, magnesium, manganese etc.

The assembly formed by the first electrode (3), the intermediate electroluminescent layer (5) of an organic component, and the second electrode (6) could be grouped together, constituting a band of an organic light-emitting diode (OLED), such as a commercial type.

Figure 2:
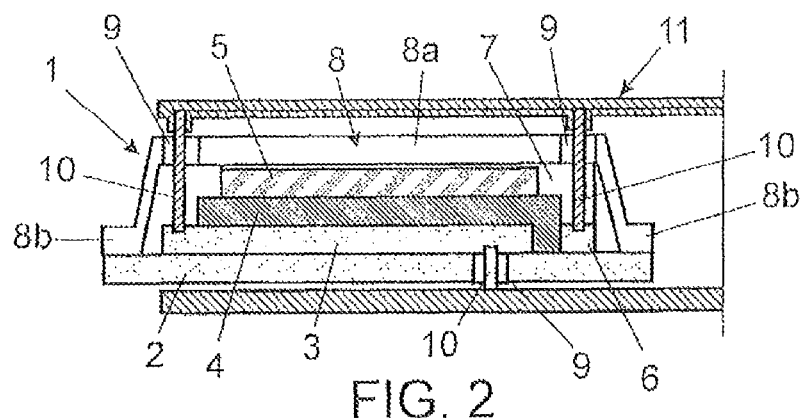
FIG. 2. shows a schematic view, similar to the one shown in the proceeding figure, of the structure of the layers of the textile element, according to the invention, in this case represented with the substrate layer and the reflective layer already joined, and also with the connector incorporated.

In the example illustrated in FIGS. 1 and 2, the upper layer (8) is characterized in that it has, between its central area (8a) and the respective lateral edges (8b) that join said layer to the substrate layer (2), spaces (9) along the entire extension of the textile element (1), prepared to be inserted with metal pins (10) of a connecting part (11) at any point of said extension, said connecting part providing the connection to the electronic control system and electrical power for operation thereof, said piece which is extractable in order to be placed at any point.

Figure 3:
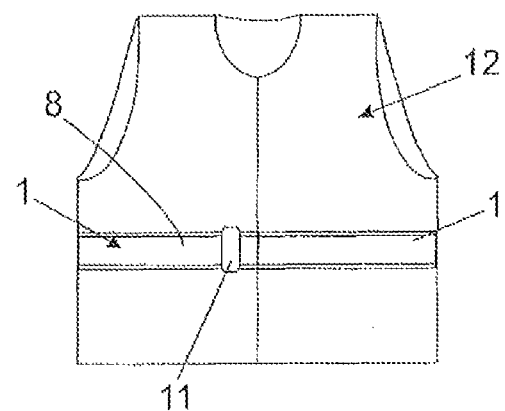
FIG. 3. shows a schematic view of a piece of clothing into which the textile element of the invention has already been incorporated, where the layout of the connector thereof can be seen.

In a preferred embodiment, the described textile element (1) consists of a strip that is continuously produced in a roll to roll process, as the existence of the connectors at the ends of a piece is not precise, allowing it to be applied to any dimension, for example on clothing (12) as shown in the example of FIG. 3.

In turn, the connecting part (11) preferably consists of a plastic piece in the form of a clip which, therefore, couples and uncouples in an easy and quick fashion and does not require tools, on any point of the textile element, onto which metal pins (10) are grafted in such a way that they secure the seal of the connection once the piece is fastened to the textile element (1). Moreover, optionally this connecting part (11) incorporates a wireless system of connection (not shown) in order to bind it to the electronic control system and battery, preferably a rechargeable battery, for example "Sepura"®, which powers the electroluminescent lamp, thereby avoiding the existence of cables or a physical connection between the connecting part and said battery.

Preferably, the upper layer (8) is a reflective layer and, also preferably, the substrate layer (2) is a non-plastic textile layer, conveniently treated.

The drawings show a case in which the first electrode (3) and the second electrode (6) are conductive bands, both of which are arranged parallel to each other directly on the substrate (2), although it is also possible to have a case in which the first electrode (3) is a lower electrode, arranged on the substrate (2), and the second electrode (6) is an upper electrode, arranged contiguous to the upper layer (8). In both cases, the pins (10) of the connecting part (11) can be on the same face of the textile element (1) on the upper reflective layer (8), as shown in FIGS. 1 to 3. Although it is also possible that the pins (10) are on opposite sides, close to one of the edges of the textile element (1).

The electroluminescent device, which is the substrate layer (2), the first electrode (3), the active dielectric layer (4), the intermediate layer of ZnS (5), the second electrode (6) and the transparent conductive layer (7), is printed directly onto the substrate (2), after encapsulation with the upper electroluminescent layer (8) which is joined at it ends to the substrate layer (2). Moreover, the joining of the upper layer (8) and the substrate layer (2) at the edges (8*b*) is done through opportune processes of high-frequency soldering and vacuum soldering.

In all, the textile element (1) has reflective properties on its entire surface and, likewise, the electroluminescent lamp thereof when connected also emits light on its entire surface, coinciding with the reflective area. Moreover it can print any design of light, such as squares, rays or names, conserving 100% of the original aspect of the reflective properties and emitting such designs.

Having thus adequately described the nature of the present invention, as well as how to put it into practice, it is deemed unnecessary to make this description any longer in order for anyone skilled in the art to understand the scope of the invention and the advantages deriving therefrom. It must be noted that, within its essential nature, the invention may be carried out according to other embodiments differing in detail from that set out by way of example, which the protection sought would equally cover, provided that the fundamental principle thereof is not altered, changed or modified.

The invention claimed is:

1. A light-emitting textile element with a free connection system which has a structure that comprises at least one electroluminescent lamp made up of:
   a substrate layer (2);
   a first electrode (3);
   an active dielectric layer (4);
   an intermediate electroluminescent layer (5), made up of an electroluminescent material, such as Zinc sulfide;
   a second electrode (6);
   a transparent conductive layer (7); and
   an upper reflective layer (8) that is joined to the substrate layer (2), and which is characterized in that the upper layer (8) presents spaces (9) along the entire extension of the textile element (1), prepared to receive, at any point of said extension, the insertion of individual metal pins (10) of an extractable connecting part (11) that provides connection to the electronic control system and electrical power for its operation, and which is coupled to a desired point of the textile element.

2. The light-emitting textile element with a free connection system, according to claim 1, characterized in that the connecting part (11) consists of a clip.

3. The light-emitting textile element with a free connection system, according to claim 1, characterized in that the metal pins (10) of the connecting part (11) are grafted onto it to ensure the seal of the connection.

4. The light-emitting textile element with a free connection system, according to claim 1, characterized in that the connecting part (11) incorporates a wireless connection system to be attached to the electronic control system and battery for electrical power.

5. The light-emitting textile element with a free connection system, according to claim 1, characterized in that it is configured in the form of a strip produced in a continuous way.

6. The light-emitting textile element with a free connection system, according to claim 1, characterized in that the substrate layer (2) is a treated non-plastic textile layer.

7. The light-emitting textile element with a free connection system, according to claim 1, characterized in that the upper layer (8) is a reflective layer.

8. The light-emitting textile element with a free connection system, according to claim 7, characterized in that said element has reflective properties on its entire surface and, likewise, the electroluminescent lamp, when connected, also emits light on the entire surface thereof, coinciding with the reflective area.

9. The light-emitting textile element with a free connection system, according to claim 1, characterized in that the connection between the upper layer (8) and the substrate layer (2) on the edges (8*b*) thereof, is a joint that is made by high-frequency soldering.

* * * * *